(12) United States Patent
Lindholm

(10) Patent No.: US 11,091,162 B2
(45) Date of Patent: Aug. 17, 2021

(54) FUSION OF FRONT VEHICLE SENSOR DATA FOR DETECTION AND RANGING OF PRECEDING OBJECTS

(71) Applicant: TOYOTA MOTOR ENGINEERING & MANUFACTURING NORTH AMERICA, INC., Erlanger, KY (US)

(72) Inventor: Trenton B. Lindholm, Canton, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 182 days.

(21) Appl. No.: 15/883,607

(22) Filed: Jan. 30, 2018

(65) Prior Publication Data
US 2019/0232964 A1    Aug. 1, 2019

(51) Int. Cl.
| | | |
|---|---|---|
| B60W 40/04 | (2006.01) | |
| G01S 13/86 | (2006.01) | |
| G06K 9/00 | (2006.01) | |
| G06K 9/62 | (2006.01) | |
| G01S 13/931 | (2020.01) | |
| G01S 15/931 | (2020.01) | |
| G06T 7/70 | (2017.01) | |
| H04N 5/33 | (2006.01) | |

(52) U.S. Cl.
CPC .......... *B60W 40/04* (2013.01); *G01S 13/862* (2013.01); *G01S 13/867* (2013.01); *G06K 9/00805* (2013.01); *G06K 9/6288* (2013.01); *B60W 2420/403* (2013.01); *B60W 2420/42* (2013.01); *B60W 2420/52* (2013.01); *B60W 2420/54* (2013.01); *B60W 2554/801* (2020.02); *G01S 13/931* (2013.01); *G01S 15/931* (2013.01); *G01S 2013/9319* (2020.01); *G01S 2013/93185* (2020.01); *G06K 9/6267* (2013.01); *G06T 7/70* (2017.01); *G06T 2207/20081* (2013.01); *H04N 5/33* (2013.01)

(58) Field of Classification Search
CPC combination set(s) only.
See application file for complete search history.

(56) References Cited

U.S. PATENT DOCUMENTS

| | | | |
|---|---|---|---|
| 7,457,699 B2 | 11/2008 | Chia | |
| 8,666,546 B2 | 3/2014 | Sarh et al. | |
| 8,880,319 B2 | 11/2014 | Tsuruta et al. | |
| 9,460,625 B2 | 10/2016 | Wells | |
| 9,744,901 B2 | 8/2017 | Goto et al. | |
| 10,445,597 B2 * | 10/2019 | Jackson | G10L 15/083 |
| 10,445,928 B2 * | 10/2019 | Nehmadi | G06T 17/05 |
| 2007/0152804 A1 * | 7/2007 | Breed | B60N 2/2863 |
| | | | 340/435 |

(Continued)

*Primary Examiner* — Christian Chace
*Assistant Examiner* — Amelia Vorce
(74) *Attorney, Agent, or Firm* — Oblon, McClelland, Maier & Neustadt, L.L.P.

(57) ABSTRACT

The present disclosure relates to a method for determining inter-vehicle distance during adaptive cruise control. Moreover, the method is directed to the integration of multiple sensing modalities to accurately determine inter-vehicle distance at close ranges. This approach exploits standard, vehicle-based sensors and processing circuitry to improve the selection of sensing modalities during inter-vehicle distance determination.

18 Claims, 9 Drawing Sheets

(56) References Cited

U.S. PATENT DOCUMENTS

| | | | |
|---|---|---|---|
| 2009/0254260 A1* | 10/2009 | Nix | G01S 15/878 |
| | | | 701/96 |
| 2010/0100324 A1* | 4/2010 | Caminiti | G08G 1/164 |
| | | | 701/301 |
| 2013/0093887 A1 | 4/2013 | Wu et al. | |
| 2015/0253416 A1* | 9/2015 | Kim | G01S 17/89 |
| | | | 356/4.07 |
| 2015/0336547 A1* | 11/2015 | Dagan | B60T 7/22 |
| | | | 701/70 |
| 2016/0009283 A1* | 1/2016 | Tokimasa | B60W 10/18 |
| | | | 701/96 |
| 2016/0009284 A1* | 1/2016 | Tokimasa | G01S 13/931 |
| | | | 701/96 |
| 2017/0003134 A1* | 1/2017 | Kim | B60R 1/00 |
| 2017/0011625 A1* | 1/2017 | Stelzig | G08G 1/0116 |
| 2017/0015315 A1 | 1/2017 | Hattori et al. | |
| 2017/0123429 A1* | 5/2017 | Levinson | G05D 1/0214 |
| 2017/0154241 A1* | 6/2017 | Shambik | B60R 1/00 |
| 2017/0322298 A1* | 11/2017 | Beitelspacher | G01S 13/22 |
| 2017/0359561 A1* | 12/2017 | Vallespi-Gonzalez | |
| | | | G06T 7/593 |
| 2018/0033310 A1* | 2/2018 | Kentley-Klay | G06K 9/00805 |
| 2018/0074506 A1* | 3/2018 | Branson | G01S 15/931 |
| 2018/0075309 A1* | 3/2018 | Sathyanarayana | G05D 1/0088 |
| 2018/0106885 A1* | 4/2018 | Blayvas | G01S 13/862 |
| 2018/0165829 A1* | 6/2018 | Hong | G06T 7/70 |
| 2018/0257661 A1* | 9/2018 | Kroop | B60W 50/0098 |
| 2018/0276278 A1* | 9/2018 | Cagan | G06N 5/046 |
| 2018/0292222 A1* | 10/2018 | Lin | G01S 17/936 |
| 2018/0292825 A1* | 10/2018 | Smolyanskiy | B62D 15/025 |
| 2018/0300620 A1* | 10/2018 | Gerardo Castro | G01S 7/4802 |
| 2018/0314921 A1* | 11/2018 | Mercep | G06K 9/00791 |
| 2018/0365888 A1* | 12/2018 | Satzoda | G06T 7/70 |
| 2019/0050692 A1* | 2/2019 | Sharma | G06K 9/6292 |
| 2019/0092318 A1* | 3/2019 | Mei | G06N 3/084 |
| 2019/0130182 A1* | 5/2019 | Zang | G06K 9/00651 |
| 2019/0156485 A1* | 5/2019 | Pfeiffer | G06K 9/00791 |
| 2019/0193728 A1* | 6/2019 | Tanaka | G08G 1/16 |
| 2019/0196480 A1* | 6/2019 | Taylor | G05D 1/0214 |
| 2019/0225210 A1* | 7/2019 | Herman | G06T 7/55 |
| 2019/0227553 A1* | 7/2019 | Kentley-Klay | B60H 1/00735 |
| 2019/0251356 A1* | 8/2019 | Rivers | G06T 3/60 |
| 2019/0258251 A1* | 8/2019 | Ditty | G05D 1/0088 |
| 2019/0311221 A1* | 10/2019 | Nariyambut Murali | |
| | | | G06K 9/00818 |
| 2020/0057488 A1* | 2/2020 | Johnson | G06T 15/205 |

\* cited by examiner

FUSION OF FRONT VEHICLE SENSOR DATA FOR DETECTION AND RANGING OF PRECEDING OBJECTS

BACKGROUND

Adaptive cruise control (ACC) systems increase driver safety and confidence by utilizing front-facing sensors to detect the size, speed, and range of preceding objects. In the instance where the driver chooses to utilize ACC for longitudinal control, the ACC can generate a command to alter the speed of the vehicle in order to maintain a safe inter-vehicle driving distance. U.S. Pat. No. 7,457,699 entitled "Technique for detecting truck trailer for stop and go adaptive cruise control" by Chia is directed to a radar-based approach to detection of close range truck trailers that might otherwise be inaccurately predicted. While this approach aims to improve detection of vehicles with inconsistent rear planes (i.e., construction materials projecting from a truck bed, truck trailers at a distance above the tires), radar remains suboptimal in close range situations, thus requiring a new approach for detecting preceding objects.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a method, apparatus, and a computer-readable medium configured for determining a distance between a vehicle and a preceding object, comprising acquiring, via a first sensing modality, a first sensed parameter related to the distance between the vehicle and the preceding object, determining, via a processing circuitry, a magnitude of the first sensed parameter acquired via the first sensing modality, acquiring, via a second sensing modality, a second sensed parameter related to the distance between the vehicle and the preceding object, determining, via a processing circuitry, a magnitude of the second sensed parameter acquired via the second sensing modality, and selecting the first sensed parameter, the second sensed parameter, or a combination thereof, based upon the determination of the magnitude of the first sensed parameter and the magnitude of the second sensed parameter relative to pre-determined thresholds, to determine the distance between the vehicle and the preceding object.

According to an embodiment, the present disclosure is further related to acquiring, via camera, an image related to the preceding object, classifying the image related to the preceding object, and selecting the first sensed parameter, the second sensed parameter, or a combination thereof based upon the classification of the image related to the preceding object.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
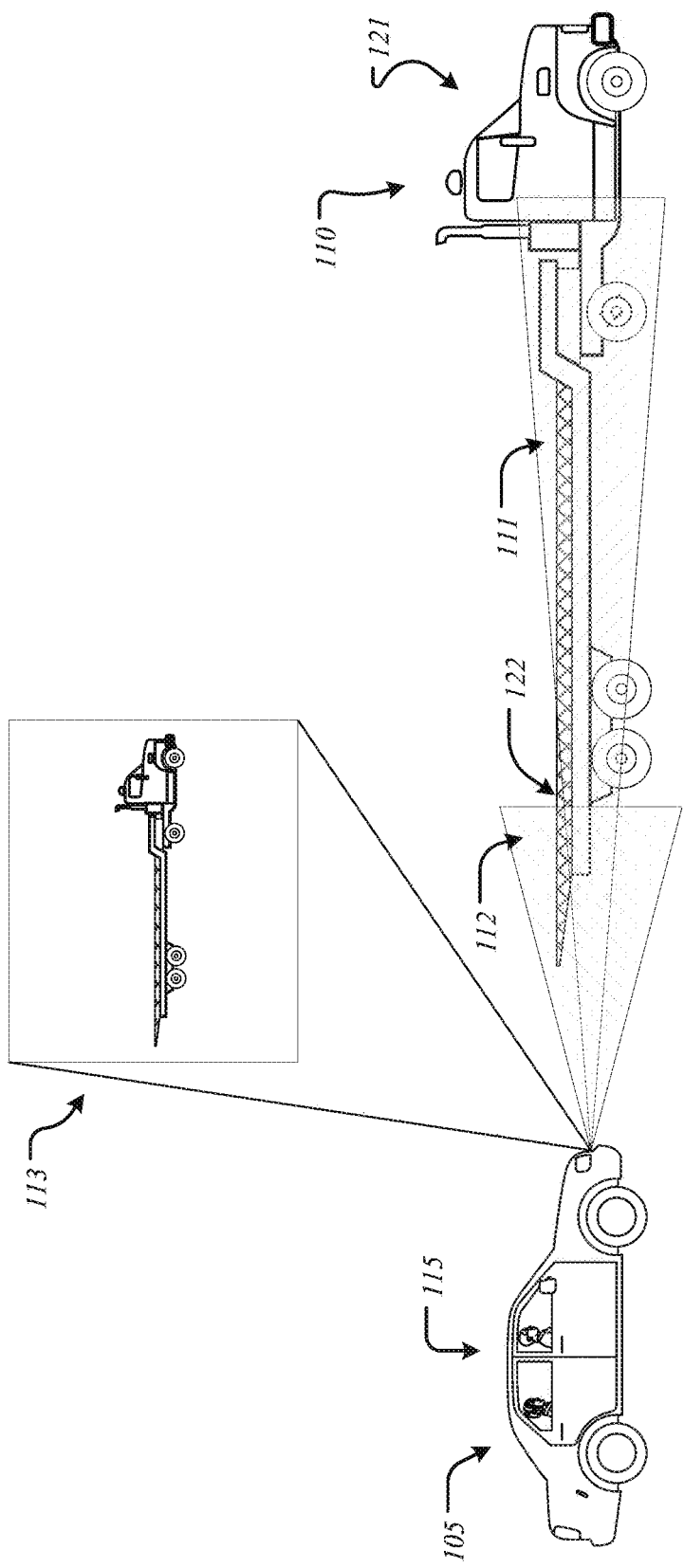
FIG. 1 is an illustration of a user vehicle relative to a preceding vehicle, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Adaptive cruise control (ACC) is widely deployed in modern vehicles in order to improve passenger safety. To do this, ACC actively measures the distance between a user's vehicle and a preceding vehicle, integrating this distance information with known speed information of the user's vehicle, in addition to other inputs, to determine if the user vehicle's speed needs to be adjusted in order to maintain a pre-determined following distance or achieve a target speed. Often, distancing is performed via radar, a highly-effective system for determining the range of a vehicle in ideal situations (e.g. highway travel at distance). In stop and go traffic, however, or when the preceding vehicle is carrying an awkward load that extends from the rear plane of the vehicle, the accuracy of radar-based information can decrease, impacting the ability of ACC to properly control vehicle speed and avoid collision.

This shortcoming is the result of the technical foundation of the radar-based system deployed in vehicles. Radar transmitters emit a narrow cone of radio waves that come into contact with objects and are reflected or scattered in a variety of directions. As a portion of the waves are reflected and received at a receiver at known time and frequency intervals, the distance to the preceding object can be determined. In order to determine one distance from the variety of signals, however, a centroid of highest reflectivity from the preceding object is selected. This centroid may encompass a large percentage of the rear perspective of the preceding vehicle but may also only represent a small fraction of the preceding vehicle. These discrepancies can, in the instance of a flat-bed truck carrying steel I-beams, result in an inaccurate determination of the true distance to the most rear aspect of the preceding vehicle. For example, as a user vehicle approaches a preceding vehicle, the preceding vehicle, and any rear aspect, may depart the narrow cone of radio waves emitted by the user vehicle, exiting the radar field of view and becoming untraceable. At this point, a distancing technology efficient at close range is necessary.

For this reason, as described herein, the present disclosure introduces a system for integrating camera, radar, and sonar in order to accurately determine distances between vehicles across a range of distances.

FIG. 1 is an illustration of a user vehicle relative to a preceding vehicle, according to an exemplary embodiment of the present disclosure. A present vehicle 105 is traveling at a distance and at a known speed behind a preceding vehicle 110. In an embodiment, the present vehicle 105 is a user vehicle 115 equipped to carry passengers, and the preceding vehicle 110 is a flat-bed trailer truck 121 equipped for transporting heavy equipment. In an embodiment, a rear aspect of a flat-bed trailer 122 of the flat-bed trailer truck 121 is not within radar field of view 111 of the user vehicle 115. This rear aspect of the flat-bed trailer 122 of the flat-bed trailer truck 121, not traceable by radar due to its proximity to the user vehicle 115, is, however, within the sonar field of view 112 of the user vehicle 115. In an embodiment, the heavy equipment, or similar, of a flat-bed trailer 122 of the flat-bed trailer truck 121 reflects radio waves with high intensity. Though not the most rear aspect of the flat-bed trailer truck 121, this heavy equipment may disproportionately impact the ability of the radar system to accurately determine the distance to the flat-bed trailer 122. As a result, this can obfuscate the true distance between the user vehicle 115 and the rear aspect of the flat-bed trailer truck 121. Front-facing cameras of the user vehicle 115 capture images 113 of the preceding vehicle. These captured images 113 are used to determine the identity of the preceding vehicle, further informing the accuracy of the above mentioned distancing techniques, as the competency of distancing techniques is impacted by vehicle type (i.e. shape, size, cargo).

While radar is known to be effective at determining longer distances, sonar, owing to the technical limitations of using sound waves, is more effective at determining shorter distances. Therefore, in an exemplary embodiment, as a preceding vehicle nears the boundary between these two distancing approaches, it is necessary for the user vehicle to make a determination as to which distancing approach to employ. Based upon the identification of the preceding vehicle and its predicted distance, it may be appropriate to use radar only, sonar only, or integrate the two approaches to arrive at the most accurate distance.

Figure 2:
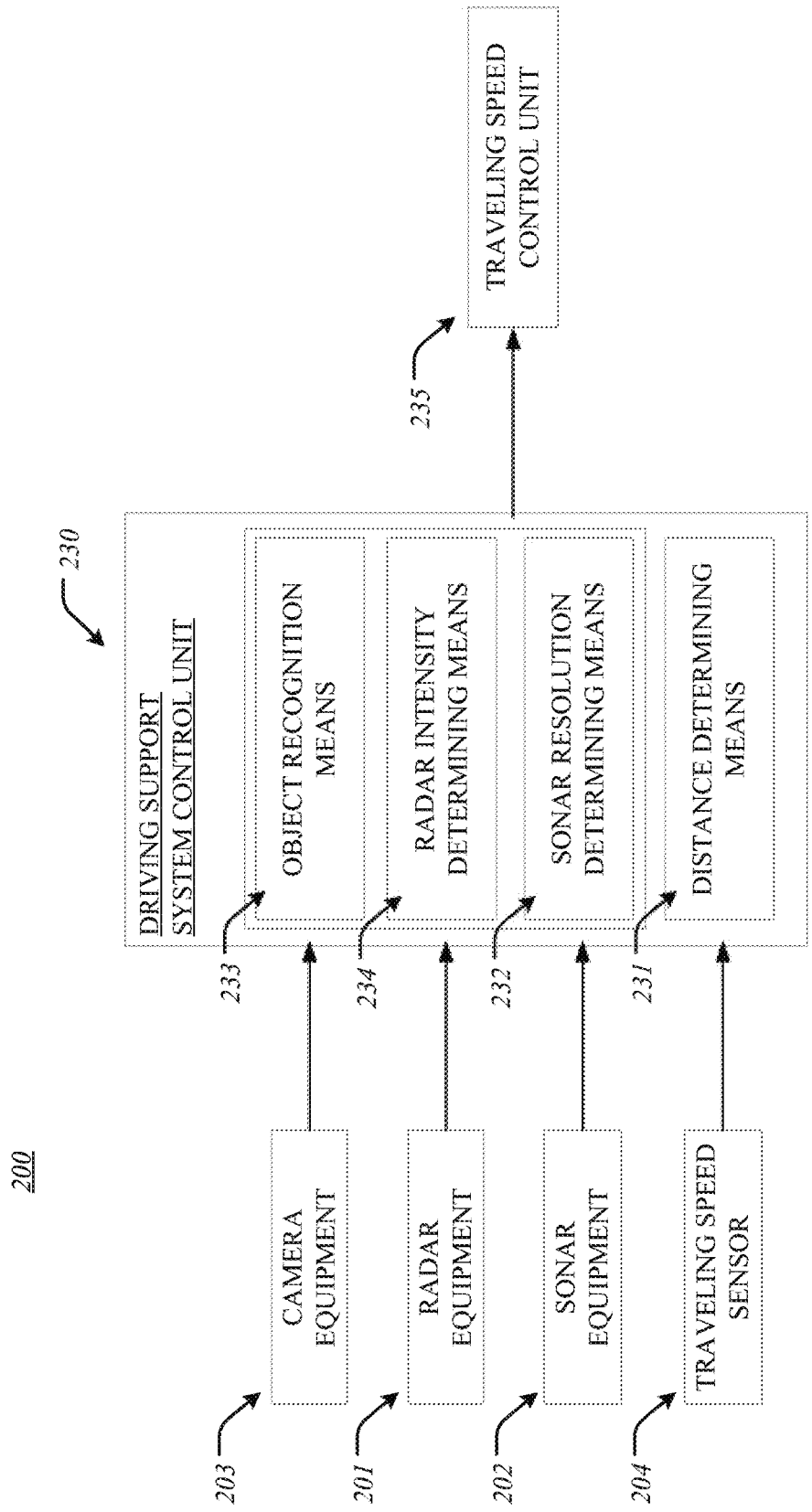
FIG. 2 is a high-level flowchart of an adaptive cruise control system of the present disclosure, including driving support system control unit and traveling speed control unit.

FIG. 2 is a high-level flowchart of an adaptive cruise control system of the present disclosure. From left to right, FIG. 2 outlines the inputs delivered to a driving support system control unit 230 responsible for accurately determining the distance to a preceding vehicle, a value that is then delivered to the traveling speed control unit 235 to modify vehicle speed.

As shown in FIG. 2, the vehicle control system 200 includes, but is not limited to, a camera 203 for capturing preceding objects, radar equipment 201 for determining the distance between preceding objects and the present vehicle, sonar equipment 202 for determining the distance between preceding objects and the present vehicle, a traveling speed sensor 204 that detects the traveling speed of the present vehicle, a driving support system control unit 230, and a traveling speed control unit 235. The driving support system control unit 230 includes, but is not limited to, an object recognition means 233 that utilizes captured images from the camera 203, a distance determining means 231, a radar intensity determining means 234, and a sonar resolution determining means 232. The distance determining means 233 utilizes data from the radar equipment 201 and sonar equipment 202, in the context of the output from the radar intensity determining means 234 and sonar resolution determining means 232, to determine the distance between the preceding vehicle and the present vehicle. Once a distance has been determined by the distance determining means 233, the value is delivered to the traveling speed control unit 235 for adjustment of the present vehicle speed, if appropriate.

According to an embodiment, the camera 203 acquires at least an image of the preceding view, including any objects within that view, and outputs the captured image to the driving support system control unit 230. The captured image from the camera 203 can be used for object recognition in order to inform the distance determining means and to register the lateral presence of a vehicle within the field of view. The presence of a vehicle and spatial location thereof, is critical in situations of environmental strain (i.e., unexpected lane changes) so that vehicle speed can be rapidly controlled. Data is continuously acquired from the camera 203 in order to provide real-time object data to the driving support system control unit 230. In an embodiment, the camera 203 is a visible light camera, an infrared camera, or a combination thereof.

According to an embodiment, the radar equipment 201 is millimeter wave radar for detecting a preceding object, including a vehicle, and measuring the distance between the present vehicle and the preceding vehicle. Vehicle-based millimeter wave radar equipment 201 mixes transmitted waves (millimeter waves) that are emitted from a transmitter and received waves reflected from the preceding vehicle so as to extract a beat frequency in the mixed signal whereby information about a distance between the present vehicle and the preceding vehicle is acquired. This distance information is then outputted to the driving support system control unit 230. In an embodiment, information regarding the distance to the preceding vehicle is determined via localization of a centroid of reflected radio waves captured at the receiver. Similar to a heat map, a pixelated rendering of radio wave intensities is generated and a region with the highest intensity is selected as the rear aspect of the preceding vehicle. In another embodiment, information regarding the distance to the preceding vehicle is determined from the waveform peaks of a frequency spectrum as correlated with objects in a field of view. Data is continuously acquired from the radar equipment 201 in order to provide real-time data to the driving support system control unit 230.

According to an embodiment, sonar equipment 202, as is known in the art, utilizes sound waves at close range to determine a distance between a present vehicle and a preceding object, such as a vehicle. Vehicle-based sonar equipment 202 measures a period from a time when an ultrasonic wave, inaudible to humans, is emitted, to a time when the waves reflected by the preceding object arrive back at the sonar equipment 202. This time domain data informs distance determining, the output of which is delivered to the driving support system control unit 230. Data is continuously acquired from the sonar equipment 202 in order to provide real-time data to the driving support system control unit 230.

According to an embodiment, the traveling speed sensor 204 detects a traveling speed of the present vehicle and outputs the traveling speed to the driving support system control unit 230. This traveling speed is bundled with the determined distance from the driving support system control unit 230 and passed through the driving support system control unit 230 to the traveling speed control unit 235, wherein the two values are utilized by the traveling speed control unit 235 to determine traveling speed adjustments, if appropriate. Data is continuously acquired from the traveling speed sensor 204 in order to provide real-time data to the driving support system control unit 230 and, thus, the traveling speed control unit 235.

According to an embodiment of the present disclosure, the camera 203, millimeter wave radar equipment 201, sonar equipment 202, and traveling speed sensor 204 are commercially-available products capable of implementation according to respective specification limitations.

According to an embodiment, the driving support system control unit 230 is a well-known microcomputer having CPU (central processing unit), ROM (read only memory), RAM (random access memory) and I/O (input and output) interface. The control program stored in a memory unit such as ROM enables the CPU to serve as the below-described object recognition means 233, distance determining means 231, radar intensity determining means, and sonar resolution determining means 232. An exemplary embodiment of the driving support system control unit 230 is described in FIG. 9.

According to an embodiment, the object recognition means 233 is configured to determine, based upon captured images from the camera equipment 203, the identity of a preceding vehicle. According to standard machine learning approaches, an algorithm, or similar process, such as a convolutional neural network, is trained on a database of available, known vehicles, allowing for the classification of preceding vehicles including, but not limited to, motorcycles, cars, or trucks. Further, sub-classifications according to make and model can be determined to allow for increased specificity and awareness as related to the speed, weight, and shape of preceding vehicles.

In an exemplary embodiment of the database of the object recognition means 233, the database contains a corpus of reference images, wherein each reference image comprises an identifiable reference object and is associated in the database with a corresponding text description of the reference object. Further, the database contains a plurality of image query resolution data structures, each comprising a collection of records wherein each record includes an image descriptor of one of the reference images. Each data structure is, therefore, searchable using a corresponding one of a set of predetermined search processes to identify a closest match record within the data structure based upon the image descriptors.

According to an embodiment, the distance determining means 231 is configured to determine an accurate inter-vehicle distance based upon distance data from the radar equipment 201 and the sonar equipment 202 integrated with object data from the camera equipment 203, via the object recognition means 233.

During distance determination, the distance determining means 231 of the driving support system control unit 230 must select an appropriate source for distancing data. To this end, a data stream is selected, either from radar equipment 201, sonar equipment 202, or a fusion of the two data streams, as delivered to the driving support system control unit 230, in order to accurately estimate inter-vehicle distance. In determining the appropriate data source, each data stream can be evaluated with respect to a pre-determined threshold. For radar, wherein a signal is generated from a centroid of maximum reflectivity, a threshold is set at a pre-determined reflectivity intensity. Intensities above this pre-determined reflectivity intensity are deemed to provide an accurate representation of the distance of the preceding object, a threshold set in accordance with specifications of the radar equipment 201. For sonar, wherein a signal is generated in the context of air-based noise, a threshold is set at a pre-determined resolution. Resolutions above this pre-determined resolution threshold are deemed to provide an accurate estimation of the distance of the preceding object, a threshold set in accordance with specifications of the sonar equipment 202.

In an exemplary embodiment of the distance determining means of the present disclosure, wherein pre-determined radar and sonar thresholds are employed, a preceding vehicle is a sedan and is traveling at a speed relatively slower than a present vehicle. Initially, the sedan is 20 meters ahead of the present vehicle, wherein radar intensity is above a pre-determined threshold and sonar resolution is below a pre-determined resolution. In this case, radar is selected as the ideal modality for the distance determining means. As the inter-vehicle distance narrows, a distance is approached (e.g., 6 meters) where sonar resolution and radar intensity are both above their respective thresholds. In the context of information from camera equipment and the identification of the preceding vehicle, a determination can be made to transition to sonar, to remain only with radar, or to fuse the two data streams into one distance output. As the inter-vehicle distance continues to narrow, radar intensity may drop below the pre-determined threshold while sonar, effective at close range where the impact of noise is minimal, continues to display a resolution above a respective threshold. As a result, sonar is selected as the ideal modality. The above described methodology for sensor selection is applicable, as well, when the inter-vehicle distance is increasing. Further, at respective inter-vehicle distances from near to far, data stream quality drives the decision making process.

According to an exemplary embodiment of the present disclosure, and as referred to above, object recognition according to captured images from the camera equipment is utilized to aid in the selection of distancing modality for distance determination. For example, if a vehicle is within range of both radar and sonar, data from each data source may be fused in order to produce an improved output. However, if it is determined, via object recognition, that the preceding vehicle is a flat-bet truck with trailer, it may be appropriate to prioritize sonar data, as the ability for radar to accurately detect the rear aspect of the flat-bed truck is minimal.

According to an embodiment, a traveling speed control unit 235 controls the traveling speed of the present vehicle based on the traveling speed set in advance by the driver and the distance and speed inputs from the driving support system control unit. For example, when activating ACC, the driver selects a desired traveling speed. Cognizant of the desired traveling speed, the traveling speed control unit 235 adjusts vehicle traveling speed via the throttle subsystem and the brake subsystem in order to maintain the desired traveling speed. In an embodiment, as it is determined via front facing sensors that a preceding vehicle is within the sensing range of the vehicle, a determination is made whether or not to modify vehicle traveling speed. In an exemplary embodiment, a preceding vehicle is traveling at a speed relatively slower than the present vehicle. The traveling speed control unit 235 can, when appropriate, utilize the current traveling speed passed through the driving support system control unit 230 and determined inter-vehicle distance from the driving support system control unit 230 in order to generate a signal to activate the brake subsystem. As traveling speed equilibrates or, as the preceding vehicle exits the field of view of the front facing sensors, the traveling speed control unit 235 can recognize any discrepancy between the current traveling speed and the target traveling speed and generate a signal, accordingly.

Figure 3:
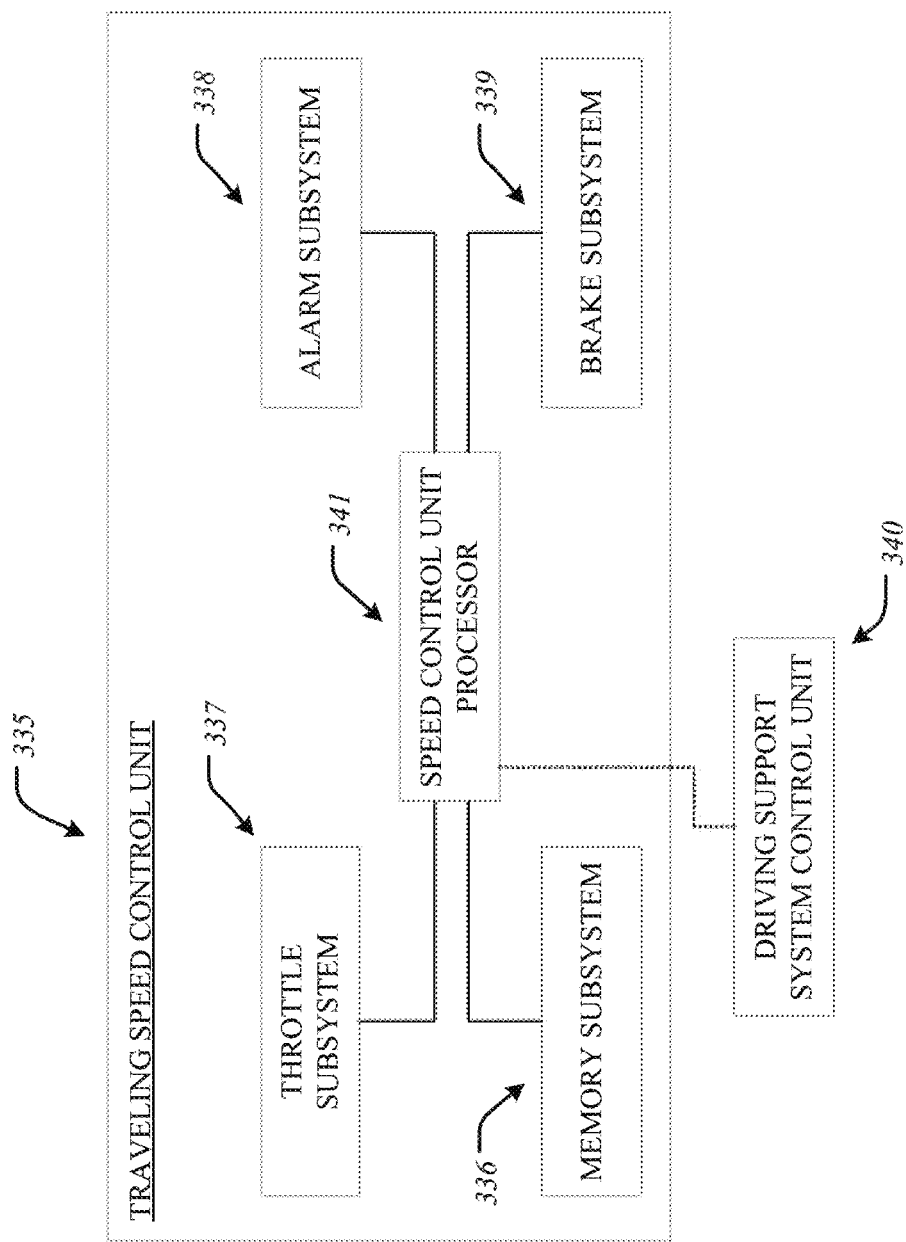
FIG. 3 is a block diagram of a traveling speed control unit, according to an exemplary embodiment of the present disclosure.

Subsequently, FIG. 3 is a block diagram of a traveling speed control unit and its connection to the driving support system control unit, according to an exemplary embodiment of the present disclosure. The traveling speed control unit 335 includes, but is not limited to, a memory subsystem 336, a throttle subsystem 337, a brake subsystem 339, and an alarm subsystem 338. Data regarding the inter-vehicle distance and the current traveling speed are delivered from the driving support system control unit 340 to the traveling speed control unit 335. The target traveling speed, selected by the driver at the time of ACC activation, is stored in the memory subsystem 336. The memory subsystem 336 generally includes an application appropriate amount of volatile memory (e.g., dynamic random access memory (DRAM)) and non-volatile memory (e.g., flash memory, electrically erasable programmable read only memory (EEPROM)). In an embodiment, processor executable code, for determining the relative speed adjustment of the present vehicle, is stored within the non-volatile memory of the memory subsystem 336 of the traveling speed control unit 335.

According to an embodiment, the speed control unit processor 341 and memory subsystem 336 employ a proportional-integral-derivative controller (PID controller), one of a variety of suitable adaptive controllers, in order to maintain an appropriate inter-vehicle distance in the context of the selected cruise control speed. The PID controller, a control loop feedback mechanism, provides continuous modulation of the output through calculation of an error value as the difference between a measured process and a desired set-point and applies a correction based on proportional, integral, and derivative terms in order to achieve the set-point. Similarly, in the context of the present embodiment, the speed control unit processor 341 can generate signals to the throttle subsystem 337 and brake subsystem 339, as appropriate, in order to modulate vehicle speed about a set-point. If necessary, the speed control unit processor 341 may provide control signals to the alarm subsystem 338 causing it to provide visual and/or audible feedback to a driver of the present vehicle.

In an exemplary embodiment of the traveling speed control unit of the present disclosure, a driver activates ACC and sets the speed control to 80 miles per hour. A preceding vehicle, however, traveling at 75 miles per hour, is detected in front of the present vehicle. Continuous information is provided by the driving support system control unit as to the distance to the preceding vehicle and the current speed of the present vehicle. In order to maintain a safe inter-vehicle distance, the speed control unit processor 341 delivers a signal to the brake system 339 to slow the vehicle. Actively monitoring the current vehicle speed and distance to the preceding vehicle, as provided continuously by the driving support system control unit 340, the speed control unit processor 341 determines when the inter-vehicle distance is appropriate or modifies vehicle speed, as necessary. Upon the preceding vehicle exiting the field of view or increasing inter-vehicle distance beyond a safe distance, the speed control unit processor 341 can generate a signal to the throttle subsystem 337 to increase vehicle speed until the set point selected by the driver is achieved, as stored in the memory subsystem 336. Generation of commands to the throttle subsystem 337 and the brake subsystem 339 are determined in accordance with the control loop feedback mechanism of the PID controller. The use of a PID controller is understood in the art, as evidenced by U.S. Pat. No. 5,335,164A, which is incorporated herein by reference.

According to an embodiment, the inter-vehicle safe distance is determined in accordance with the traveling speed of the present vehicle. The inter-vehicle safe distance may be further informed by the make and model of the preceding vehicle, wherein size, shape, and weight of the preceding vehicle impact its ability to accelerate or decelerate, in the time domain. In an embodiment, information related to the inter-vehicle safe distance, and in the context of the identified preceding vehicle, may be updated via system software updates to the memory subsystem 336 of the traveling speed control unit 335 or via cloud-based system software updates.

According to an embodiment, the traveling speed control unit 335 includes a well-known microcomputer having CPU (central processing unit), ROM (read only memory), RAM (random access memory) and I/O (input and output) interface. The control program stored in a memory unit such as ROM enables the CPU to serve as the above-described traveling speed control unit 335.

Figure 4:
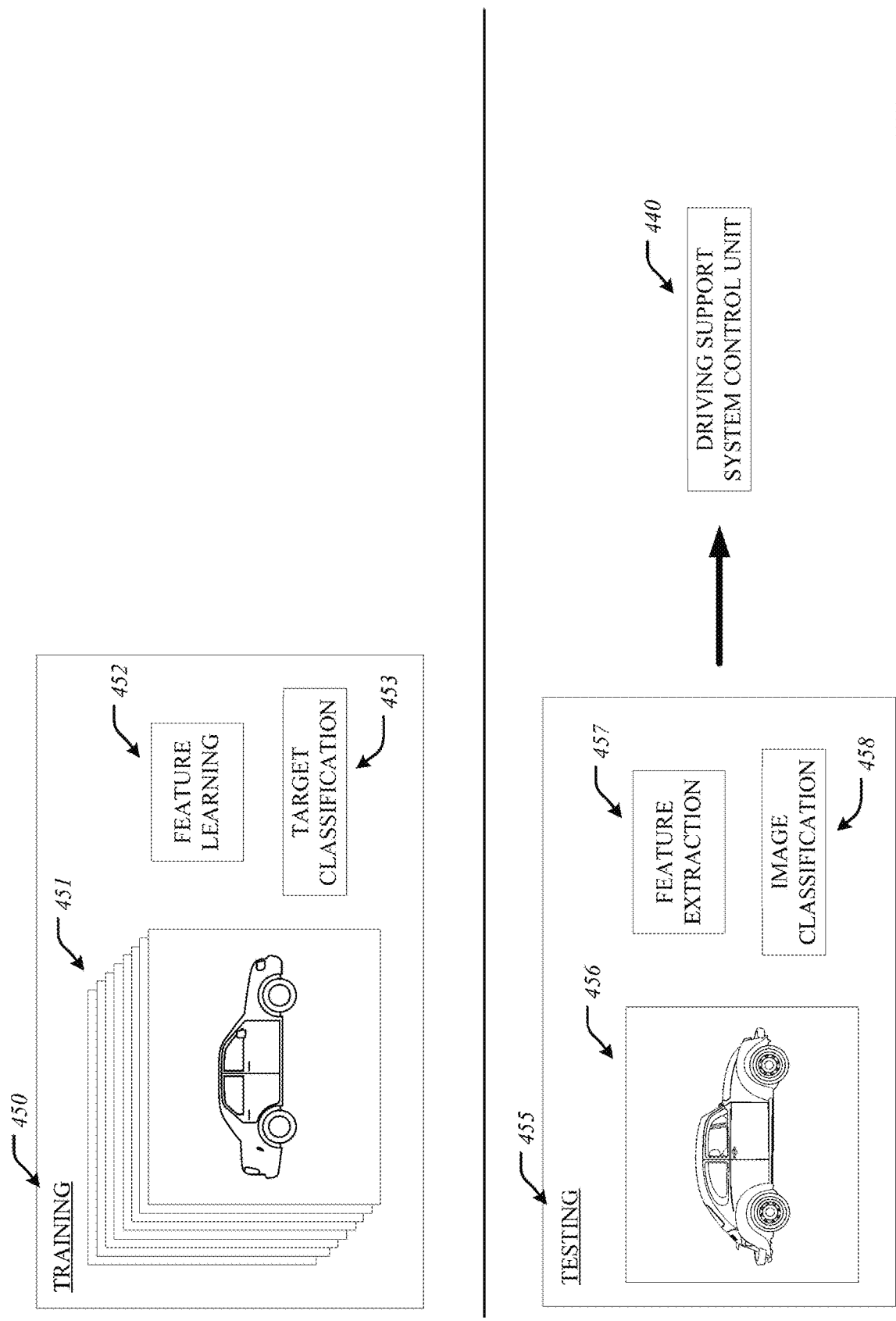
FIG. 4 is an illustration of identification of a preceding vehicle, according to an exemplary embodiment of the present disclosure.

FIG. 4 is an illustration of the identification of a preceding vehicle, according to an exemplary embodiment of the present disclosure. Identification of the preceding vehicle is accomplished via object recognition and machine learning. In an exemplary embodiment, a standard convolutional neural network (CNN) approach is used, as is understood in the art and evidenced by U.S. Pat. No. 7,747,070B2, which is incorporated herein by reference. While a CNN is described herein, it should not be considered limiting and is merely representative of a variety of approaches to object recognition. In the context of the present disclosure, a CNN is trained 450 on a curated database 451 that includes labeled images of preceding objects that may be encountered. In an embodiment, the curated database is actively maintained and updated via system software updates to the object recognition means or via cloud-based system software updates. In brief, feature learning 452 and target classification 453 are performed on the database 451. Generally, feature learning 452 comprises iterative convolution, activation via rectified linear units, and pooling, while classification 453 comprises associating learned features with known labels. Learned features (e.g. edges, corners) may be manually selected or determined by the CNN via deep learning or similar approach. Following training 450 of the CNN, testing 455 of the CNN is performed to ensure accuracy. Features are extracted 457 from a test image 456 and classified 458 according to the training classifier 450. Following confirmation of the efficacy of the trained classifier, the CNN may be implemented in the object recognition means of the driving support system control unit 440.

According to an embodiment, the training database 451 includes labeled images in order to extract features and develop classifiers to identify a variety of vehicles including, but not limited to, cars, trucks, sport-utility vehicles, tractor trailers, and motorcycles.

According to an embodiment, the training database 451 includes labeled images in order to extract features and develop classifiers to identify vehicle makes and models.

Figure 5:
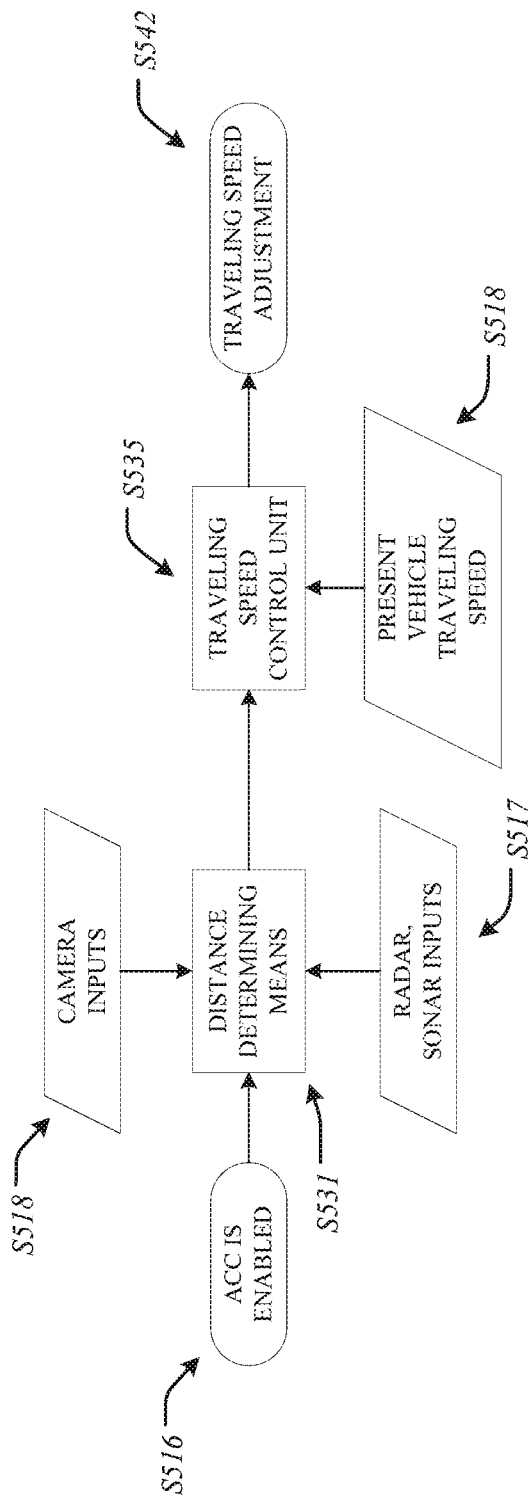
FIG. 5 is a high-level flowchart of an exemplary embodiment of the present disclosure.

FIG. 5 is a high level flowchart of an exemplary embodiment of the present disclosure. According to an embodiment, following initialization of ACC S516 and establishment of a target traveling speed, data from front facing sensors is acquired. These inputs, including camera S518, radar and sonar S517, are sent to the driving support system control unit. Within the driving support system control unit, the distance determining means S531 integrates data from captured images (i.e., object recognition) with estimated inter-vehicle distances as determined by radar and sonar. In an embodiment, the distance determining means S531 contextualizes the inputs from radar and sonar, according to radar intensity and sonar resolution, to determine a single, estimated inter-vehicle distance between a present vehicle and a preceding vehicle. This single, estimated inter-vehicle distance is delivered to the traveling speed control unit S535 along with the present vehicle traveling speed S518 determined by on-board vehicle speed sensors. The traveling speed control unit S535 then evaluates these inputs (e.g., inter-vehicle distance, present vehicle traveling speed) to identify any discrepancies with regard to ideal inter-vehicle distance (i.e., safe traveling distance) or target traveling speed (i.e. present vehicle speed v. target traveling speed). If a discrepancy exists, a traveling speed adjustment S542 is made in an effort to achieve a target distance and/or target traveling speed. Traveling speed adjustments can be made according to the PID controller of the traveling speed control unit S535 until the target is achieved. Further, a loop from the front facing sensor inputs to the traveling speed control unit iteratively progresses until ACC is disengaged.

Figure 6:
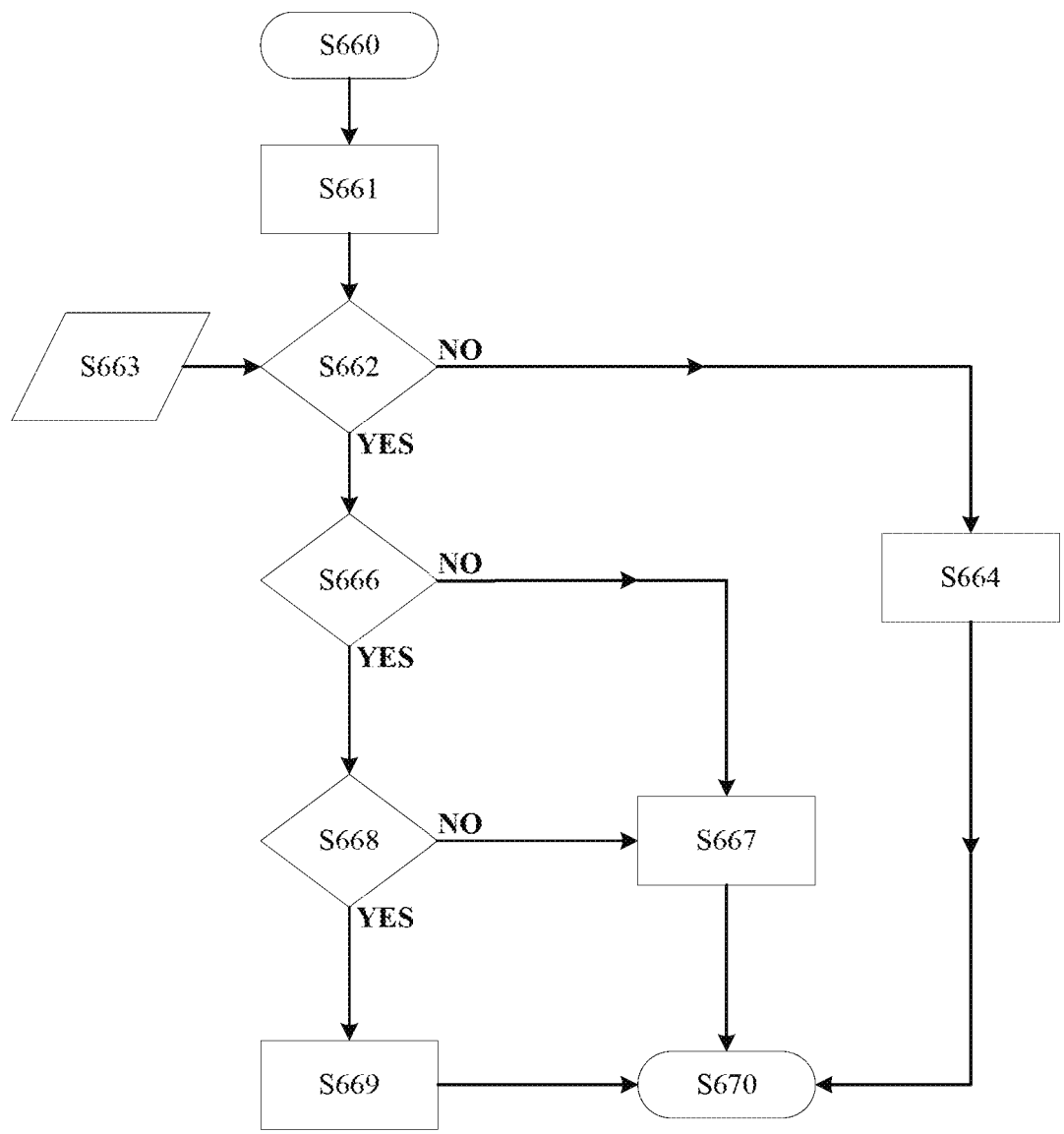
FIG. 6 is a flowchart of detecting and ranging, according to an exemplary embodiment of the present disclosure.

FIG. 6 is an exemplary flowchart of an embodiment of the distance determining means of the driving support system control unit of the present disclosure. The exemplary flowchart should be considered an iterative loop following the initialization of ACC. According to an embodiment, a vehicle is initially under the manual control of a driver, aware of the vehicle's speed and surroundings, including preceding vehicles S660. Upon user engagement of ACC S661, the vehicle initializes front sensor data acquisition, including camera, radar, and sonar. At the outset, the distance determining means determines if a preceding object, or preceding vehicle, is within range of sonar S662 (i.e., above a pre-determined threshold) as defined, in part, by the specifications of the sonar equipment. To do so, the distance determining means probes the vehicle's front facing sensors S663, including radar, camera, and sonar, in particular, to acquire data related to the position of the preceding vehicle. If it is determined that the preceding vehicle is not within range of sonar, the distance determining means will revert to radar and camera data in order to determine inter-vehicle distance S664. However, once determined that the preceding vehicle is within range of sonar, at a resolution sufficient to accurately distance the vehicle, the distance determining will then determine if the quality of the radar reflection is sufficient S666 to accurately determine inter-vehicle distance. If the radar reflection intensity has fallen below a pre-determine threshold value, as described above, sonar will be used for determining inter-vehicle distance S667. However, in an embodiment, it can be determined that the radar reflection is at an intensity so as to be accurate. In this instance, the distance determining means can consider object recognition data S668 from the camera in order to determine the reliability of the radar data. For example, although radar intensity is above a pre-determined threshold value for intensity, the preceding vehicle may be of a type that poses inherent difficulties for a radio wave-based approach. In the case of a flat-bed trailer truck, radar may identify a rear plane of the preceding vehicle. This rear plane, however, may not be the most rear aspect of the preceding vehicle, the inaccurate distancing of which may result in collision. Therefore, it may be appropriate to defer to sonar in order to map the contours of the rear plane and capture the most rear aspect of the preceding vehicle. If it is determined that radar may not be reliable, the distance determining means defers to sonar in determining inter-vehicle distance S667. In the instance, however, that the preceding vehicle is identified to be a vehicle that is reliably distanced via radar, such as a sedan, the inter-vehicle distance determined by the distance determining means may rely upon radar, sonar, or a fusion thereof S669. Following distancing, via any of the three approaches, the determined inter-vehicle distance is transmitted via the driving support system control unit to the traveling speed control unit S670 for use in traveling speed adjustments.

Figure 7C:
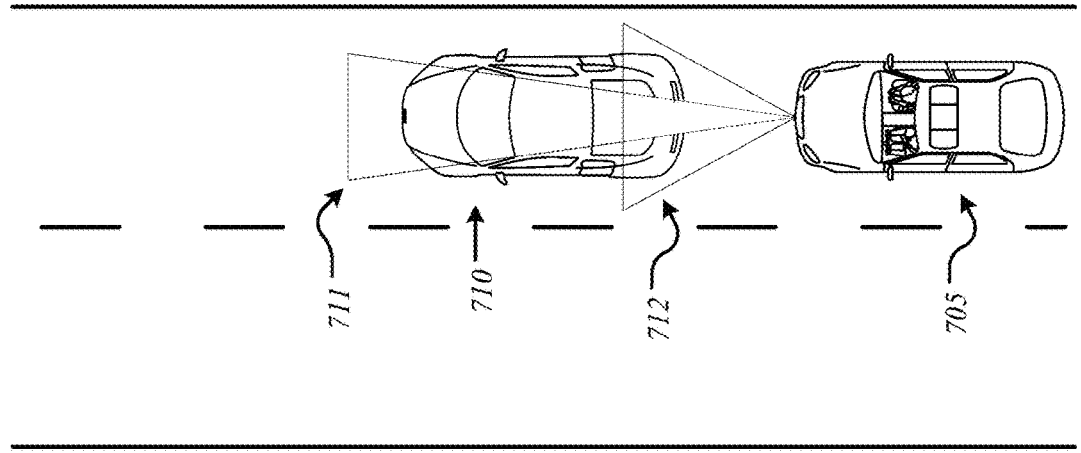
FIG. 7C is an illustration of detecting and ranging, according to an exemplary embodiment.
Figure 7B:
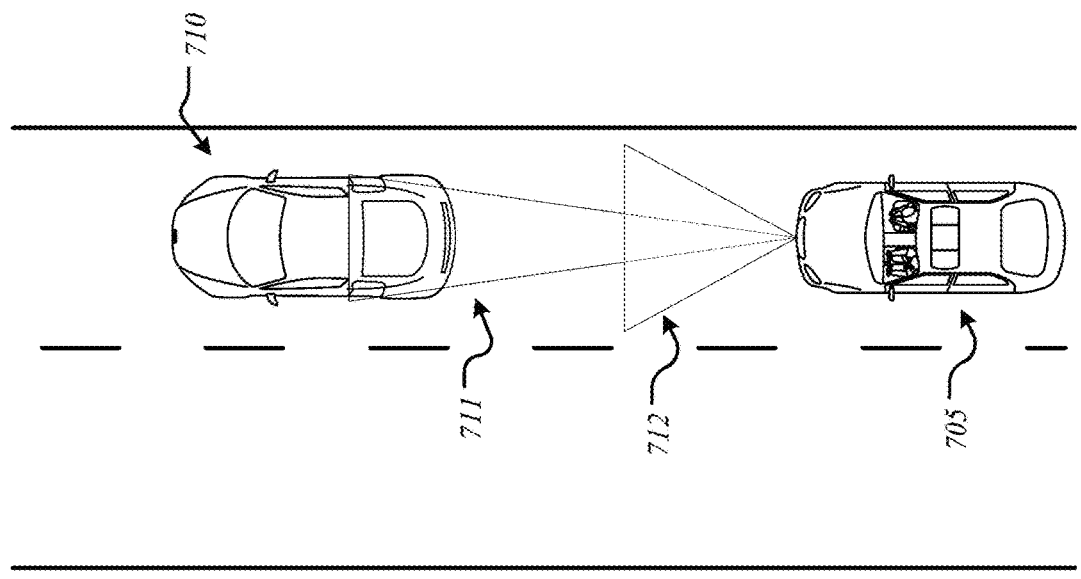
FIG. 7B is an illustration of detecting and ranging, according to an exemplary embodiment.
Figure 7A:
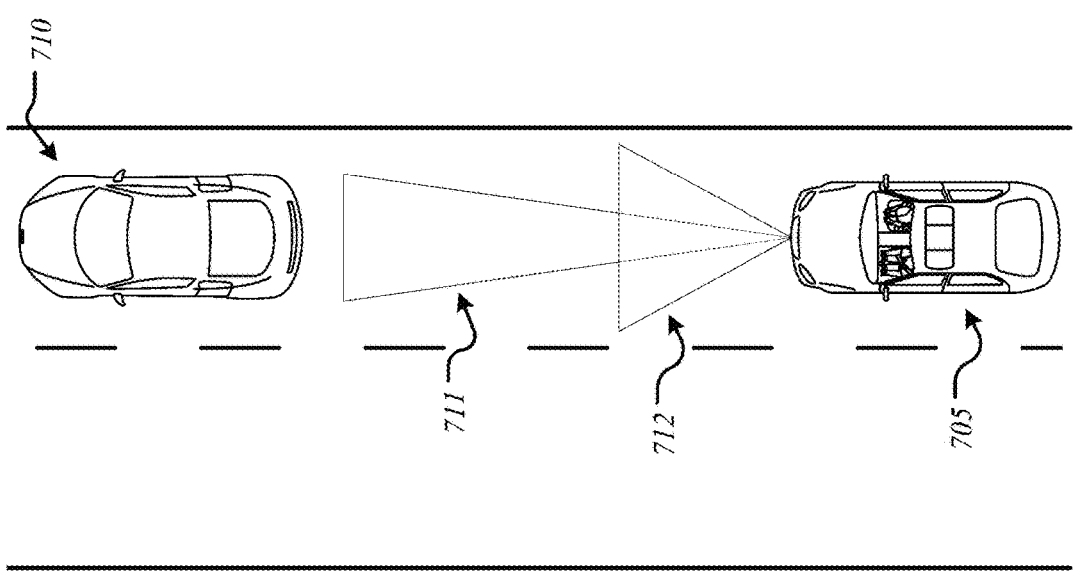
FIG. 7A is an illustration of detecting and ranging, according to an exemplary embodiment.

FIG. 7A, FIG. 7B, and FIG. 7C are illustrations of detecting and ranging of a preceding vehicle, according to an exemplary embodiment. In an embodiment, the preceding vehicle 710 is a coupe. In FIG. 7A, the preceding vehicle 710 is traveling beyond the range of either sonar field of view 712 or radar field of view 711. The preceding vehicle 710 is, however, traveling at a speed relatively slower than the present vehicle 705. In the absence of a preceding vehicle 710 within range of the sensors of the present vehicle 705, the present vehicle 705 continues ACC maintenance of the current traveling speed.

According to an embodiment, and as the present vehicle 715 approaches the preceding vehicle, as shown in FIG. 7B, the front facing sensors of the present vehicle 705 begin to detect and range the preceding vehicle 710. In an embodiment, and with the preceding vehicle 710 in the field of view of radar 711 only, radar is used to determine inter-vehicle distance. This radar-based value is then transmitted to the traveling speed control unit.

If an abrupt change in speed occurs, however, or in periods of stop and go traffic, the inter-vehicle distance may decrease to such a point that the preceding vehicle 710 is within the field of view of both sonar 712 and radar 711, as shown in FIG. 7C. In an embodiment, data from both sources are considered in determining inter-vehicle distance. If it is determined that radar reflection intensity is sufficient for ranging, as described above, a fusion of radar and sonar data will be used to provide an inter-vehicle distance to the traveling speed control unit. If however, data from radar is determined to be insufficient according to the radar reflection intensity, sonar 712 is selected in order to provide the most accurate determination of inter-vehicle distance.

Figure 8A:
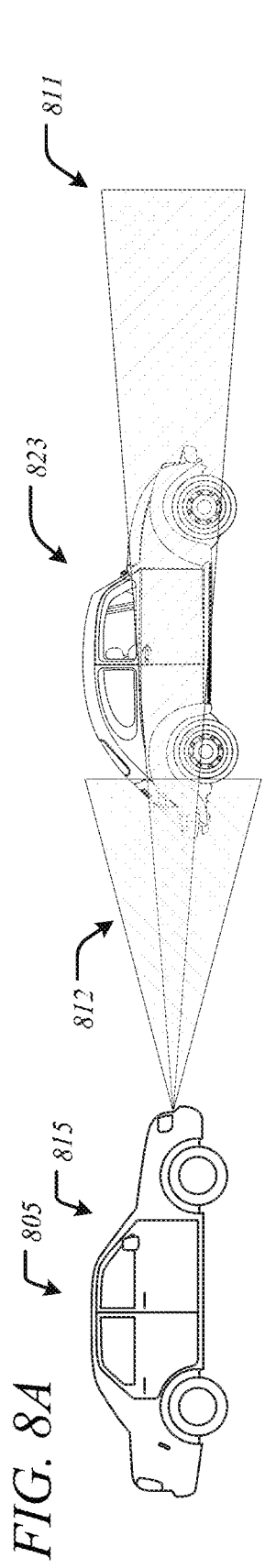
FIG. 8A is an illustration of object recognition during detecting and ranging, according to an exemplary embodiment of the present disclosure.
Figure 8B:
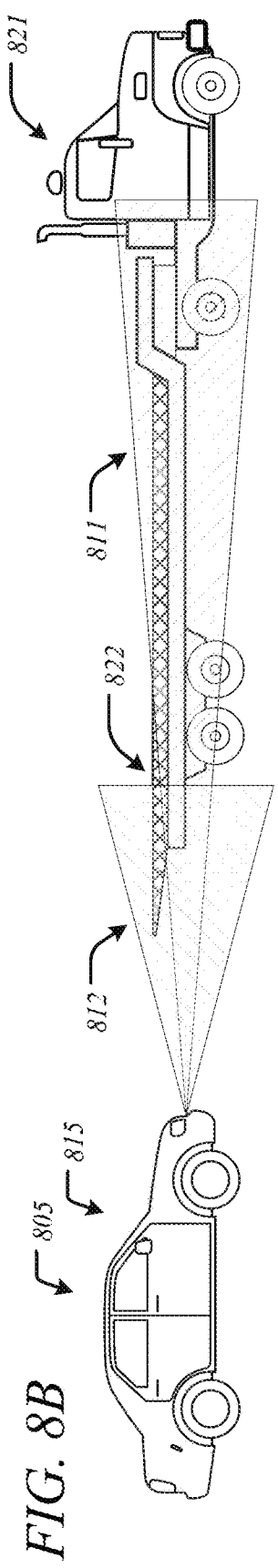
FIG. 8B is an illustration of object recognition during detecting and ranging, according to an exemplary embodiment of the present disclosure.
Figure 8C:
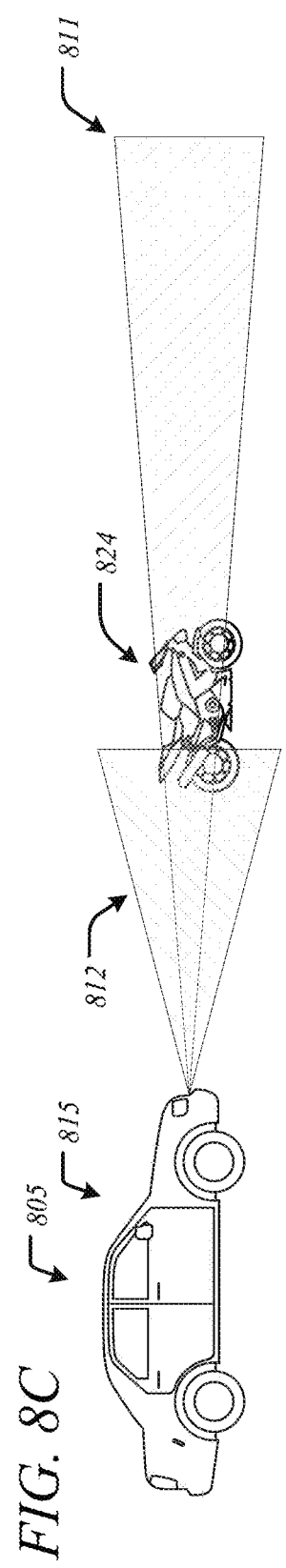
FIG. 8C is an illustration of object recognition during detecting and ranging, according to an exemplary embodiment of the present disclosure.

FIG. 8A, FIG. 8B, and FIG. 8C are illustrations of object recognition during detecting and ranging of a preceding vehicle, according to an exemplary embodiment of the present disclosure. In each Figure, a present vehicle 805 is a user vehicle 815. An algorithm, or similar process, including a CNN or similar approach for object recognition trained on a database of labeled images, classifies the preceding vehicle, accordingly.

According to an embodiment, and as shown in FIG. 8A, a preceding vehicle is a car 823. The car 823 is within range of both the radar field of view 811 and sonar field of view 812. Metrics of each data source indicate the raw data is above pre-determined thresholds. As the preceding vehicle is a car 823, with a rear plane of the car being generally planar, performance limitations of radar with respect to incongruent surfaces are obviated and radar is deemed reliable. As a result, sonar and radar data sources may be fused to determine inter-vehicle distance.

According to an embodiment, and as shown in FIG. 8B, a preceding vehicle is a flat-bed trailer truck 821. The flat-bed trailer truck 821 is within range of both the radar field of view 811 and sonar field of view 812. Further, metrics of each data source indicate the raw data is above pre-determined thresholds. In the context of the technical limitations of radar with respect to the identification of the preceding vehicle, however, it is determined that radar is unreliable and the inter-vehicle distance should be determined solely from the sonar field of view 812. As shown in FIG. 8B, although the preceding vehicle is within the field of view of radar 811, identification of the preceding vehicle as a flat-bed trailer truck 821 is critical in accounting for the inability of the centroid-based approach to identify nuances in recovered radio waves. A most rear aspect of the flat-bed 822 may not be accurately represented in the distancing data received from radar and, therefore, may not be reliable though above the reflection intensity pre-determined threshold.

According to an embodiment, and as shown in FIG. 8C, a preceding vehicle is a motorcycle 824. The motorcycle 824 is within range of both the radar field of view 811 and sonar field of view 812. Further, metrics of each data source indicate the raw data is above pre-determined thresholds. In the context of the technical limitations of radar and the identification of the preceding vehicle, however, it is determined that radar is unreliable and the inter-vehicle distance should be determined solely from the sonar field of view 812. As shown in FIG. 8C, although the preceding vehicle is within the field of view of radar 811, identification of the preceding vehicle as a motorcycle 824 is critical in accounting for the inability of the centroid-based approach to identify nuances in recovered radio waves. Rear aspects of the motorcycle 824 may not be accurately represented in the distancing data received from radar, and therefore it is recommended that distancing be deferred to sonar data, only. Moreover, as a motorcycle is capable of rapid changes in speed, identification of the preceding vehicle as a motorcycle 824 better informs a safe inter-vehicle distance, ensuring driver and rider safety.

Figure 9:
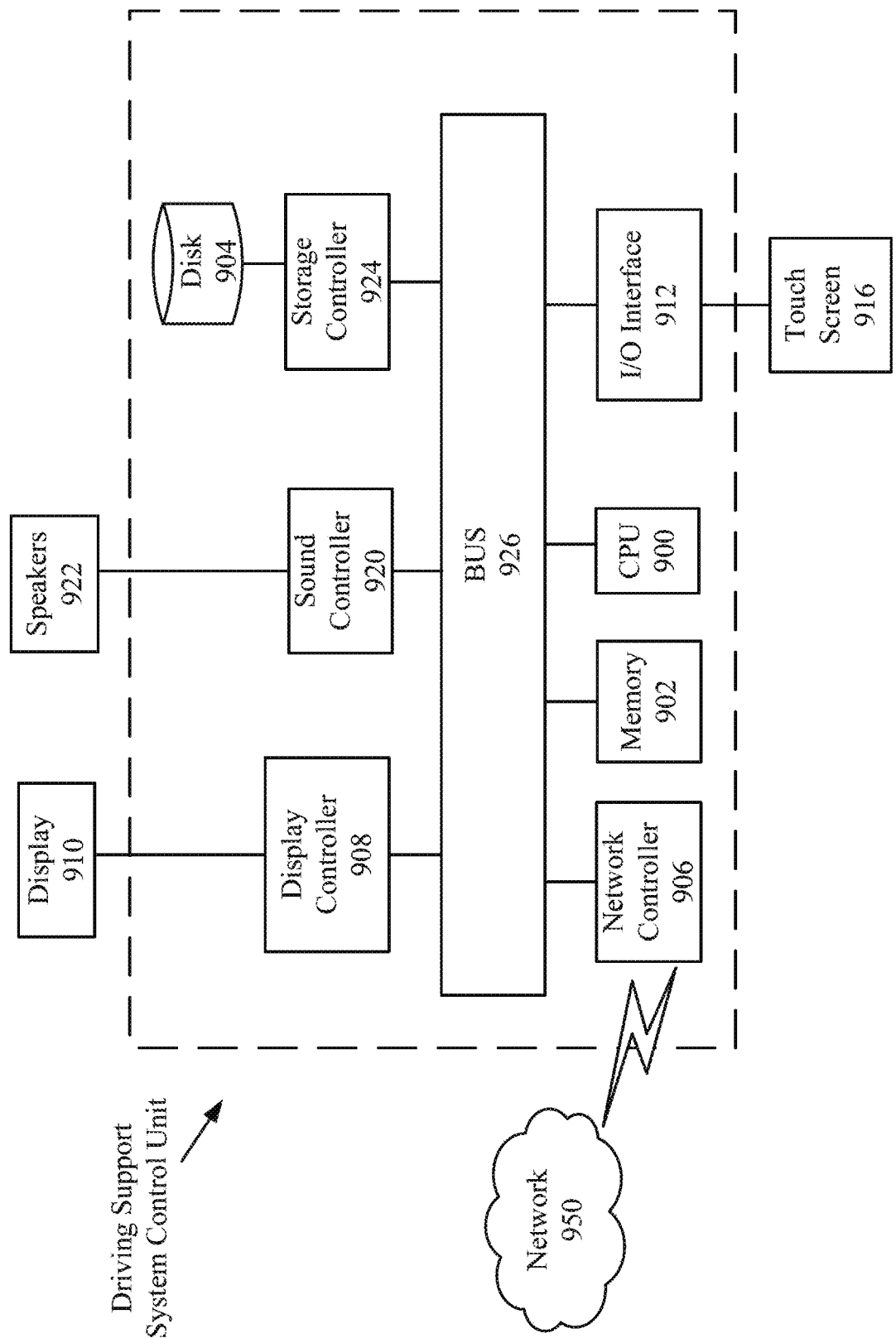
FIG. 9 is a block diagram of a hardware description of a computer configured to execute detecting, ranging, and control, according to an exemplary embodiment of the present disclosure.

FIG. 9 is a block diagram of a hardware description of a computer configured to execute detecting, ranging, and control, according to an exemplary embodiment of the present disclosure. In an embodiment, the hardware is a driving support system control unit. In FIG. 9, the driving support system control unit includes a CPU 985 which performs the processes described above/below. The process data and instructions may be stored in memory 986. These processes and instructions may also be stored on a storage medium disk 987 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the driving support system control unit communicates, such as a server or computer.

Further, the claimed advancements may be provided as a utility application, background daemon, or component of an operating system, or combination thereof, executing in conjunction with CPU 985 and an operating system such as Microsoft Windows 7, UNIX, Solaris, LINUX, Apple MAC-OS and other systems known to those skilled in the art.

The hardware elements in order to achieve the driving support system control unit may be realized by various circuitry elements, known to those skilled in the art. For example, CPU 985 may be a Xenon or Core processor from Intel of America or an Opteron processor from AMD of America, or may be other processor types that would be recognized by one of ordinary skill in the art. Alternatively, the CPU 985 may be implemented on an FPGA, ASIC, PLD or using discrete logic circuits, as one of ordinary skill in the art would recognize. Further, CPU 900 may be implemented as multiple processors cooperatively working in parallel to perform the instructions of the inventive processes described above.

The driving support system control unit in FIG. 9 also includes a network controller 988, such as an Intel Ethernet PRO network interface card from Intel Corporation of America, for interfacing with network 996. As can be appreciated, the network 996 can be a public network, such as the Internet, or a private network such as an LAN or WAN network, or any combination thereof and can also include PSTN or ISDN sub-networks. The network 996 can also be wired, such as an Ethernet network, or can be wireless such as a cellular network including EDGE, 3G and 4G wireless cellular systems. The wireless network can also be WiFi, Bluetooth, or any other wireless form of communication that is known.

The driving support system control unit further includes a display controller 989, such as a NVIDIA GeForce GTX or Quadro graphics adaptor from NVIDIA Corporation of America for interfacing with display 990, such as a Hewlett Packard HPL2445w LCD monitor. A general purpose I/O interface 991 interfaces with a touch screen panel 992 on or separate from display 990.

A sound controller 993 is also provided in the driving support system control unit, such as Sound Blaster X-Fi Titanium from Creative, to interface with speakers 994 thereby providing sounds and/or music.

The general purpose storage controller 995 connects the storage medium disk 987 with communication bus 997, which may be an ISA, EISA, VESA, PCI, or similar, for interconnecting all of the components of the driving support system control unit. A description of the general features and functionality of the display 990 as well as the display controller 989, storage controller 995, network controller 988, sound controller 993, and general purpose I/O interface 991 is omitted herein for brevity as these features are known.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for determining a distance between a vehicle and a preceding object, comprising:
   receiving first sensing data from a first sensing modality and second sensing data from a second sensing modality, the first sensing data and the second sensing data relating to the distance between the vehicle and the preceding object;
   receiving an image related to the preceding object from at least one imaging device;
   comparing, by processing circuitry, a value of the first sensing data to a predetermined threshold associated with the first sensing modality;
   comparing, by the processing circuitry, a value of the second sensing data to a predetermined threshold associated with the second sensing modality;
   classifying, by the processing circuitry, the image related to the preceding object;
   selecting, by the processing circuitry and based on the classified image related to the preceding object, the first sensing modality, the second sensing modality, or a fusion of the first sensing modality and the second sensing modality as a distancing modality when
      the comparison of the value of the first sensing data to the predetermined threshold associated with the first sensing modality and
      the comparison of the value of the second sensing data to the predetermined threshold associated with the second sensing modality
      indicate the value of the first sensing data and the value of the second sensing data are above respective predetermined thresholds; and
   determining, by the processing circuitry, the distance between the vehicle and the preceding object based on a distance value of the selected distancing modality,
   wherein a classification of the preceding object of the classified image indicates a reliability of the first sensing modality and a reliability of the second sensing modality.

2. The method according to claim 1, wherein the classifying comprises classifying the image related to the preceding object based upon a classifier trained on a database of reference images of preceding objects, wherein features of each reference image within the database of reference images of preceding objects are labeled and the classifier is trained to classify each reference image within the database of reference images of preceding objects according to labels associated with the features of each reference image within the database of reference images of preceding objects.

3. The method according to claim 1, wherein one of the first sensing modality and the second sensing modality is sonar and the other one of the first sensing modality and the second sensing modality is radar.

4. The method according to claim 1, wherein one of the first sensing data and the second sensing data is radar reflective intensity and the other one of the first sensing data and the second sensing data is sonar resolution.

5. The method according to claim 1, wherein the at least one imaging device is a visible light camera or an infrared camera.

6. A non-transitory computer-readable medium comprising executable program instructions which, when executed by a processing circuitry, cause the processing circuitry to implement a method for determining a distance between a vehicle and a preceding object, comprising:
   receiving first sensing data from a first sensing modality and second sensing data from a second sensing modality, the first sensing data and the second sensing data relating to the distance between the vehicle and the preceding object;
   receiving an image related to the preceding object from at least one imaging device;
   comparing a value of the first sensing data to a predetermined threshold associated with the first sensing modality;
   comparing a value of the second sensing data to a predetermined threshold associated with the second sensing modality;
   classifying the image related to the preceding object;
   selecting, based on the classified image related to the preceding object, the first sensing modality, the second sensing modality, or a fusion of the first sensing modality and the second sensing modality as a distancing modality when
      the comparison of the value of the first sensing data to the predetermined threshold associated with the first sensing modality and
      the comparison of the value of the second sensing data to the predetermined threshold associated with the second sensing modality
      indicate the value of the first sensing data and the value of the second sensing data are above respective predetermined thresholds; and
   determining the distance between the vehicle and the preceding object based on a distance value of the selected distancing modality,
   wherein a classification of the preceding object of the classified image indicates a reliability of the first sensing modality and a reliability of the second sensing modality.

7. The non-transitory computer-readable medium according to claim 6, wherein the classifying comprises classifying the image related to the preceding object based upon a classifier trained on a database of reference images of preceding objects, wherein features of each reference image within the database of reference images of preceding objects are labeled and the classifier is trained to classify each reference image within the database of reference images of preceding objects according to labels associated with the features of each reference image within the database of reference images of preceding objects.

8. The non-transitory computer-readable medium according to claim 6, wherein one of the first sensing modality and the second sensing modality is sonar and the other one of the first sensing modality and the second sensing modality is radar.

9. The non-transitory computer-readable medium according to claim 6, wherein one of the first sensing data and the second sensing data is radar reflective intensity and the other one of the first sensing data and the second sensing data is sonar resolution.

10. The non-transitory computer-readable medium according to claim 6, wherein the at least one imaging device is a visible light camera or an infrared camera.

11. An apparatus for determining a distance between a vehicle and a preceding object, comprising:
   processing circuitry configured to
      receive first sensing data from a first sensing modality and second sensing data from a second sensing modality, the first sensing data and the second sensing data relating to the distance between the vehicle and the preceding object,
      receive an image related to the preceding object from at least one imaging device,
      compare a value of the first sensing data to a predetermined threshold associated with the first sensing modality,
      compare a value of the second sensing data to a predetermined threshold associated with the second sensing modality,
      classify the image related to the preceding object,
      select, based on the classified image related to the preceding object, the first sensing modality, the second sensing modality, or a fusion of the first sensing modality and the second sensing modality as a distancing modality when
         the comparison of the value of the first sensing data to the predetermined threshold associated with the first sensing modality and
         the comparison of the value of the second sensing data to the predetermined threshold associated with the second sensing modality
         indicate the value of the first sensing data and the value of the second sensing data are above respective thresholds; and
      determine the distance between the vehicle and the preceding object based on a distance value of the selected distancing modality,
         wherein a classification of the preceding object of the classified image indicates a reliability of the first sensing modality and a reliability of the second sensing modality.

12. The apparatus according to claim 11, wherein the processing circuitry is further configured to classify the image related to the preceding object based upon a classifier trained on a database of reference images of preceding objects, wherein features of each reference image within the database of reference images of preceding objects are labeled and the classifier is trained to classify each reference image within the database of reference images of preceding objects according to labels associated with the features of each reference image within the database of reference images of preceding objects.

13. The apparatus according to claim 11, wherein one of the first sensing modality and the second sensing modality is sonar and the other one of the first sensing modality and the second sensing modality is radar.

14. The apparatus according to claim 11, wherein one of the first sensing data and the second sensing data is radar reflective intensity and the other one of the first sensing data and the second sensing data is sonar resolution.

15. The apparatus according to claim 11, wherein the at least one imaging device is a visible light camera or an infrared camera.

16. The method according to claim 1, wherein a classification of the classified image indicates a reliability of the first sensing data received from the first sensing modality.

17. The non-transitory computer-readable medium according to claim 6, wherein a classification of the classified image indicates a reliability of the first sensing data received from the first sensing modality.

18. The apparatus according to claim 11, wherein a classification of the classified image indicates a reliability of the first sensing data received from the first sensing modality.

* * * * *